(12) United States Patent
Park

(10) Patent No.: US 12,517,668 B2
(45) Date of Patent: Jan. 6, 2026

(54) MEMORY CONTROLLER AND MEMORY SYSTEM WITH DATA STROBE SIGNAL CALIBRATION CIRCUIT

(71) Applicant: SK hynix Inc., Icheon-si (KR)

(72) Inventor: Seon Ha Park, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 179 days.

(21) Appl. No.: 18/469,394

(22) Filed: Sep. 18, 2023

(65) Prior Publication Data

US 2024/0302978 A1 Sep. 12, 2024

(30) Foreign Application Priority Data

Mar. 8, 2023 (KR) .................. 10-2023-0030826

(51) Int. Cl.
*G06F 3/06* (2006.01)
*G06F 13/16* (2006.01)

(52) U.S. Cl.
CPC .......... *G06F 3/0632* (2013.01); *G06F 3/0614* (2013.01); *G06F 3/0673* (2013.01); *G06F 13/1689* (2013.01)

(58) Field of Classification Search
CPC .... G06F 3/0632; G06F 3/0614; G06F 3/0673; G06F 13/1689; G06F 3/0658; G11C 7/222; G11C 7/1006; G11C 2207/2254
USPC ................................................ 365/193, 194
See application file for complete search history.

(56) References Cited

U.S. PATENT DOCUMENTS

| 6,889,334 | B1 | 5/2005 | Magro et al. | |
| 8,028,207 | B1* | 9/2011 | Villela | G11C 29/56 |
| | | | | 714/721 |
| 2012/0250433 | A1* | 10/2012 | Jeon | G06F 3/0614 |
| | | | | 365/230.08 |
| 2015/0206560 | A1* | 7/2015 | Kang | G11C 29/022 |
| | | | | 711/105 |
| 2019/0079882 | A1* | 3/2019 | Kim | G11C 29/52 |
| 2021/0027817 | A1* | 1/2021 | Chen | G11C 29/023 |
| 2022/0165321 | A1* | 5/2022 | Seo | G11C 7/1066 |
| 2023/0384970 | A1* | 11/2023 | Hwang | G11C 7/1066 |
| 2023/0386600 | A1* | 11/2023 | Lee | G11C 29/52 |
| 2023/0395108 | A1* | 12/2023 | Bhatia | G11C 7/1063 |

* cited by examiner

*Primary Examiner* — Michael T Tran
(74) *Attorney, Agent, or Firm* — Perkins Coie LLP

(57) ABSTRACT

In some embodiments of the disclosed technology, a memory controller may include a data strobe signal (DQS) calibration circuit configured to calibrate timing of a data strobe signal (DQS) for a plurality of memory dies by performing N unit DQS calibration operations, wherein N is a natural number, wherein performing the N unit DQS calibration operations includes: performing M unit DQS calibration operations in a normal mode on the plurality of memory dies, wherein M is a natural number smaller than N; upon failure of calibration during the M unit DQS calibration operations in the normal mode, determining a representative memory die of the plurality of memory dies that causes the failure of calibration; and performing N−M unit DQS calibration operations in a conditional mode on the plurality of memory dies by varying parameters associated with the representative memory die of the plurality of memory dies.

18 Claims, 7 Drawing Sheets

FIG.5

| | CNT=1 | CNT=2 | CNT=3 | ... | CNT=M |
|---|---|---|---|---|---|
| FIRST WEAKEST DIE | MEMORY DIE 1 | MEMORY DIE 1 | MEMORY DIE 1 | ... | MEMORY DIE 1 |
| SECOND WEAKEST DIE | MEMORY DIE 2 | MEMORY DIE 3 | MEMORY DIE 2 | ... | MEMORY DIE 2 |

MEMORY CONTROLLER AND MEMORY SYSTEM WITH DATA STROBE SIGNAL CALIBRATION CIRCUIT

CROSS-REFERENCE TO RELATED APPLICATIONS

This patent document claims the priority and benefits of Korean Patent Application No. 10-2023-0030826, filed on Mar. 8, 2023, which is incorporated herein by reference in its entirety.

TECHNICAL FIELD

Embodiments of the disclosed technology relate to memory controllers and memory systems with data strobe signal calibration circuits.

BACKGROUND

As the data transfer rate of a memory die or chip increases rapidly, it becomes difficult to calibrate a data strobe signal (hereinafter, referred to as "DQS") used as a reference signal for source synchronization timing of a data bus. When a plurality of memory dies are coupled to one channel, DQS calibration may fail due to a cause in a memory controller or the channel. In addition, the DQS calibration may fail due to a timing margin issue of an input/output driver of a specific memory die.

SUMMARY

In some embodiments of the disclosed technology, a memory controller may include a data strobe signal (DQS) calibration circuit configured to calibrate timing of a data strobe signal (DQS) for a plurality of memory dies by performing N unit DQS calibration operations, wherein N is a natural number, wherein performing the N unit DQS calibration operations includes: performing M unit DQS calibration operations in a normal mode on the plurality of memory dies, wherein M is a natural number smaller than N; upon failure of calibration during the M unit DQS calibration operations in the normal mode, determining a representative memory die of the plurality of memory dies that causes the failure of calibration; and performing N–M unit DQS calibration operations in a conditional mode on the plurality of memory dies by varying parameters associated with the representative memory die of the plurality of memory dies.

In some embodiments of the disclosed technology, a memory system may include a plurality of memory dies; and a memory controller coupled to the plurality of memory dies through a channel, wherein the memory controller includes a data strobe signal (DQS) calibration circuit configured to calibrate timing of a data strobe signal (DQS) for the plurality of memory dies by performing N unit DQS calibration operations, wherein N is a natural number, wherein performing the N unit DQS calibration operations includes: performing M unit DQS calibration operations in a normal mode on the plurality of memory dies, wherein M is a natural number smaller than N; upon failure of calibration during the M unit DQS calibration operations in the normal mode, determining a representative memory die of the plurality of memory dies that causes the failure of calibration; and performing N–M unit DQS calibration operations in a conditional mode on the plurality of memory dies by varying parameters associated with the representative memory die of the plurality of memory dies.

A memory controller based on some embodiments of the disclosed technology may perform a basic DQS calibration operation on a plurality of memory dies "N" times ("N" is a natural number), wherein the memory controller may sequentially perform DQS calibration in a normal mode in which the basic DQS calibration operation is performed "M" times ("M" is a natural number smaller than "N") and DQS calibration in a conditional mode in which the basic DQS calibration operation is performed "N–M" times. In the DQS calibration in the conditional mode, the basic DQS calibration operation may be performed while changing a setting value of a weakest die providing a cause of failure of the DQS calibration in the normal mode.

A memory system based on some embodiments of the disclosed technology may include a plurality of memory dies, and a memory controller coupled to the plurality of memory dies through the same channel. The memory controller may perform a basic DQS calibration operation on a plurality of memory dies "N" times ("N" is a natural number), wherein the memory controller may sequentially perform DQS calibration in a normal mode in which the basic DQS calibration operation is performed "M" times ("M" is a natural number smaller than "N") and DQS calibration in a conditional mode in which the basic DQS calibration operation is performed "N–M" times. In the DQS calibration in the conditional mode, the basic DQS calibration operation may be performed while changing a setting value of a weakest die providing a cause of failure of the DQS calibration in the normal mode.

BRIEF DESCRIPTION OF THE DRAWINGS

FIG. 5 is a diagram illustrating a method of storing a first weak die and a second weak die in a process of performing DQS calibration in a normal mode.

DETAILED DESCRIPTION OF THE EMBODIMENTS

In the description of the embodiments of the present disclosure, descriptions such as "first" and "second" are for distinguishing elements, and are not used to limit the members themselves or to mean a specific order. The description that one component is "connected" or "coupled" to another component may be electrically or mechanically directly connected or connected to another component. Alternatively, other separate components may be interposed in the middle to form a connection relationship or a connection relationship. The term "predetermined" means that the value of a parameter is predetermined when using that parameter in a process or algorithm. The value of the parameter may be set when a process or algorithm starts or may be set during a period during which a process or algorithm is performed, depending on embodiments.

"Logic high level" and "logic low level" are used to describe different logic levels of signals. A signal having a "logic high level" is distinguished from a signal having a "logic low level." For example, when a signal having a first voltage corresponds to a "logic high level," a signal having a second voltage may correspond to a "logic low level." According to an embodiment, the "logic high level" may be set to a higher voltage than the "logic low level." Meanwhile, the logic levels of the signals may be set to other logic levels or opposite logic levels according to embodiments. For example, a signal having a logic high level may be set to have a logic low level according to embodiments, and a signal having a logic low level may be set to have a logic high level according to embodiments.

Figure 1:
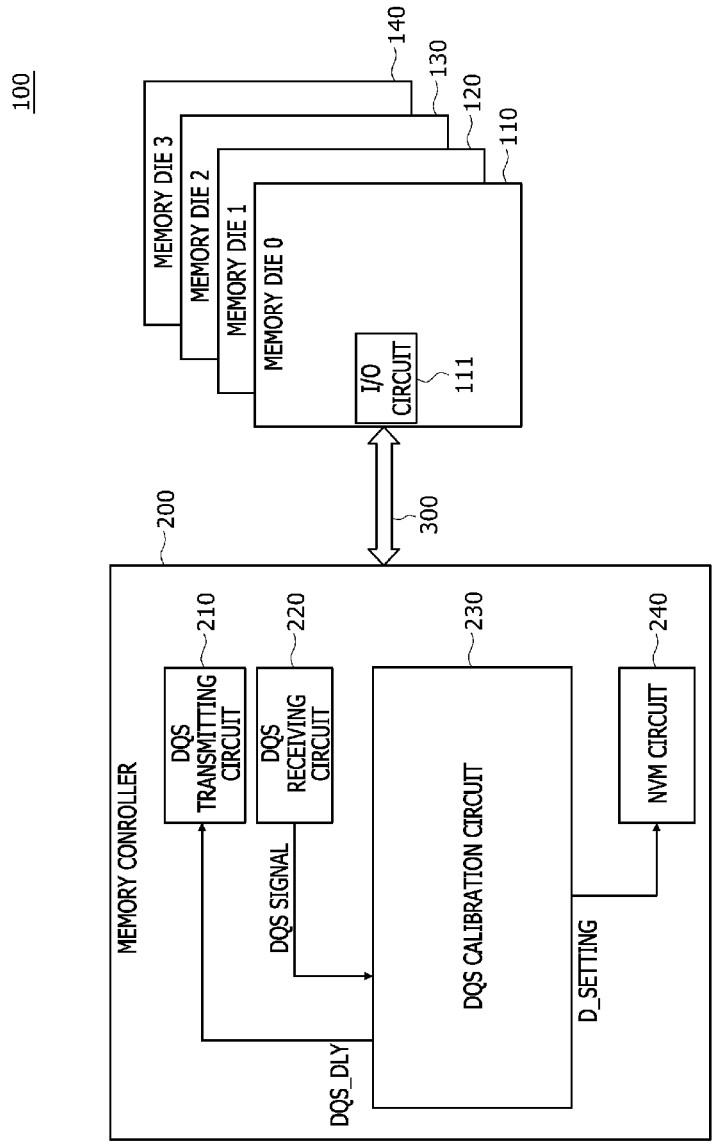
FIG. 1 is a block diagram illustrating a memory system with a DQS calibration circuit based on some embodiments of the disclosed technology.

FIG. 1 is a block diagram illustrating a memory system 100 including a data strobe signal ("DOS") calibration circuit 230 based on some embodiments of the disclosed technology. The operations of read data and write data between a memory device and its memory controller are performed in synchronization with the DQS signal as a clock signal. The DQS calibration circuit 230 performs a DQS calibration process to adjust or calibrate the timing or delay of the DQS signal in data read and data write operations Referring to FIG. 1, in some implementations, the memory system 100 may include a plurality of memory dies and a memory controller. In one example, the memory system 100 may include first to fourth memory dies 110-140, and a memory controller 200. In some implementations, the first to fourth memory dies 110-140 may include memory cell arrays (not shown). In an embodiment, each of the first to fourth memory dies 110-140 may be a nonvolatile memory device such as a NAND flash memory device. In another embodiment, each of the first to fourth memory dies 110-140 may be a volatile memory device such as a DRAM device. Each of the first to fourth memory dies 110-140 may include an input/output circuit. As illustrated in FIG. 1, the first memory die 110 may include a first input/output circuit 111. The first to fourth memory dies 110-140 may be coupled to a channel 300 in common through their respective input/output circuits. The first to fourth memory dies 110-140 may receive data from the memory controller 200 through the input/output circuits, or transmit data to the memory controller 200 through the input/output circuits. When the first to fourth memory dies 110-140 receive data from the memory controller 200, the first to fourth memory dies 110-140 may receive a DQS, together with the data from the memory controller 200. On the other hand, when the first to fourth memory dies 110-140 transmit data to the memory controller 200, the first to fourth memory dies 110-140 may transmit the DQS, together with the data to the memory controller 200.

The memory controller 200 may control memory operations such as read and write operations of the first to fourth memory dies 110-140. The memory controller 200 may be coupled to the first to fourth memory dies 110-140 in common through the channel 300. The channel 300 may include a signal/address transmission line and a data transmission line. The memory controller 200 may transmit control signals and address signals to the first to fourth memory dies 110-140 through the signal/address transmission line. In addition, the memory controller 200 may receive read data from the first to fourth memory dies 110-140 through the data transmission line, or transmit data to the first to fourth memory dies 110-140 through the data transmission line.

The memory controller 200 may include a DQS transmitting circuit 210, a DQS receiving circuit 220, a DQS calibration circuit 230, and a nonvolatile memory (NVM) circuit 240. Although not illustrated in FIG. 1, the memory controller 200 may include various components that can be used to control the first to fourth memory dies 110-140, such as a command/address generating circuit, a scheduler, a data buffer, or others. When the DQS transmitting circuit 210 transmits write data to the first to fourth memory dies 110-140, the DQS transmitting circuit 210 may generate the DQS to be transmitted together with the write data, and transmit the DQS to the first to fourth memory dies 110-140. In an embodiment, the DQS transmitting circuit 210 may receive a delayed DQS (DQS_DLY) from the DQS calibration circuit 230 while a DQS calibration process is performed. In this case, the DQS transmitting circuit 210 may output the delayed DQS (DQS_DLY) as the DQS. The DQS receiving circuit 220 may receive the DQS transmitted together with read data from the first to fourth memory dies 110-140. In some implementations, the DQS calibration process may refer to a process of calibrating the timing of the DQS in data read and data write operations.

The DQS calibration circuit 230 may control a DQS calibration operation. The DQS calibration circuit 230 may first perform the DQS calibration operation in a normal mode. When the DQS calibration in the normal mode does not succeed, the DQS calibration circuit 230 may perform the DQS calibration operation in a conditional mode. The DQS calibration operation in the normal mode and the DQS calibration operation in the conditional mode performed by the DQS calibration circuit 230 will be described in more detail below.

The DQS calibration performed by the DQS calibration circuit 230 may include read DQS calibration for calibrating the DQS timing during a data read operation and write DQS calibration for calibrating the DQS timing during a data write operation. In an embodiment, the DQS calibration circuit 230 may first perform the read DQS calibration, followed by the write DQS calibration.

In order to perform the read DQS calibration, test data may be first written to the first to fourth memory dies 110-140 in a single data rate (SDR) mode. Next, while reading the test data from the first to fourth memory dies 110-140 by switching to a double data rate (DDR) mode, it may be determined whether the test data is located within a valid window of the DQS. When the test data is not located within the valid window of the DQS, after delaying the DQS by a preset delay value, an operation of reading the test data from the first to fourth memory dies 110-140 may be performed again. This process may be repeatedly performed until the read DQS calibration succeeds, that is, until it is determined that the test data is located within the valid window of the DQS in the read process.

In order to perform the write DQS calibration, test data may be first written to the first to fourth memory dies 110-140, together with the DQS in the DDR mode. Next, the test data may be read using the valid window obtained from the read DQS calibration, and it may be determined whether the test data is located within the valid window of the DQS in the process of writing the write data to the first to fourth memory dies 110-140. When the test data is not located within the valid window of the DQS, after delaying the DQS by the preset delay value, the process of writing the test data to the first to fourth memory dies 110-140 may be performed again. Subsequently, a read operation on the test data may be performed, and a process of determining whether the test data in the write process is located within the valid window of the DQS may be performed again. This process may be repeatedly performed until the write calibration succeeds, that is, until it is determined that the test data is located within the valid window of the DQS in the write process.

The DQS calibration circuit 230 may receive the DQS from the DQS receiving circuit 220 in the process of performing the DQS calibration. In addition, the DQS calibration circuit 230 may generate the delayed DQS (DQS_DLY), and transmit the delayed DQS (DQS_DLY) to the DQS transmitting circuit 210 in the process of performing the DQS calibration. While the DQS calibration circuit 230 performs the DQS calibration operation, the DQS calibration circuit 230 may perform N basic DQS calibration operations (where N is a natural number). In some implementations, the term "basic DQS calibration operation" can be used to indicate a unit of DQS calibration operation that the DQS calibration circuit performs as part of DQS calibration process. Here, the basic DQS calibration operation may refer to a process of delaying the DQS to calibrate or adjust a skew between the read data or write data and the DQS. Among the basic DQS calibration operations of the total of N times (N is a natural number), up to M times (M is a natural number smaller than N) of basic DQS calibration operations may be performed in the normal mode, and up to N–M times basic DQS calibration operations may be performed in the conditional mode.

The DQS calibration circuit 230 may select a first weak die and a second weak die while performing the DQS calibration operation in the normal mode. After completing the DQS calibration in the normal mode, the DQS calibration circuit 230 may select a weakest die that provides a cause of failure of the DQS calibration in the normal mode. In some implementations, the term "weakest die" can be used to indicate a memory die that causes the failure of calibration. In some implementations, the term "representative memory" may be used to indicate such a "weakest die." The DQS calibration circuit 230 may perform the DQS calibration in the conditional mode while changing or varying a parameter or a setting value of the weakest die. The DQS calibration circuit 230 may generate and output the parameter or the setting value of the weakest die applied to a successful basic DQS calibration as the die setting value D_SETTING while performing the conditional DQS calibration operation.

The nonvolatile memory (NVM) circuit 240 may receive the die setting value D_SETTING output from the DQS calibration circuit 230. The nonvolatile memory (NVM) circuit 240 may store the received die setting value D_SETTING, and then, transmit the die setting value D_SETTING to a setting register of the weakest die.

Figure 2:
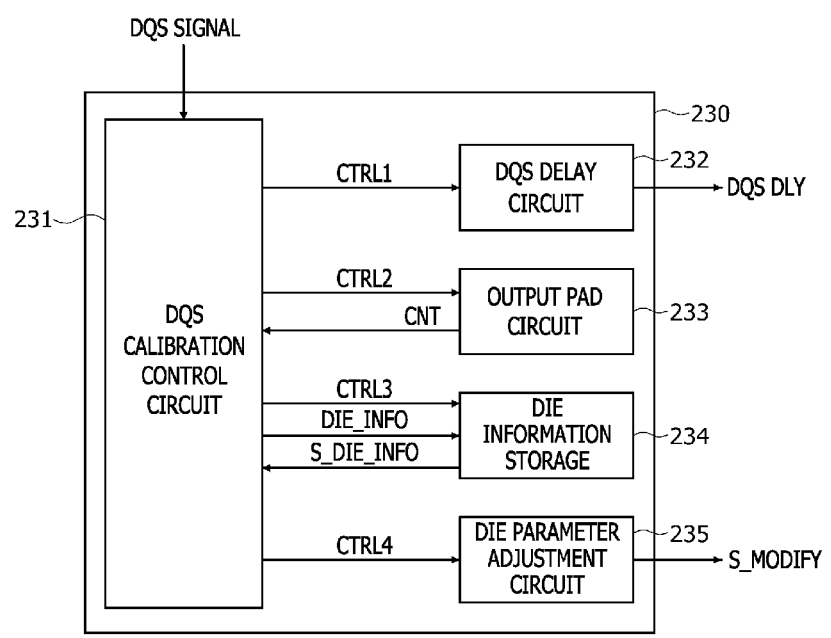
FIG. 2 is a block diagram illustrating the DQS calibration circuit included in the memory system of FIG. 1.

FIG. 2 is a block diagram illustrating the DQS calibration circuit 230 included in the memory system 100 of FIG. 1. Referring to FIG. 2, the DQS calibration circuit 230 may include a DQS calibration control circuit 231, a DQS delay circuit 232, a counter circuit 233, a die information storage 234, and a die parameter adjustment circuit 235.

The DQS calibration control circuit 231 may control the overall DQS calibration process in the normal mode and the conditional mode. Specifically, the DQS calibration control circuit 231 may receive the DQS from the DQS receiving circuit (e.g., 220 in FIG. 1) at each basic DQS calibration, and determine whether the DQS calibration is successful. In an embodiment, the DQS calibration control circuit 231 may compare timings of data receptions or transmissions and timings of the DQS to determine whether the DQS calibration is successful. The DQS calibration control circuit 231 may generate control signals CTRLs for the DQS calibration operation to transmit the control signals CTRLs to the DQS delay circuit 232, the counter circuit 233, the die information storage 234, and the die parameter adjustment circuit 235.

When the entire DQS calibration process is set to perform N basic DQS calibration operations (e.g., repeat the basic DQS calibration operation "N" times, where "N" is a natural number), the DQS calibration control circuit 231 may perform M basic DQS calibration operations in the normal mode (e.g., perform the basic DQS calibration operation up to "M" times, where "M" is a natural number smaller than "N") first, and then perform N–M basic DQS calibration operations in the conditional mode (e.g., perform the basic DQS calibration operation up to "N–M" times). In the normal mode, while the basic DQS calibration operation is performed up to "M" times, the DQS calibration control circuit 231 may generate information about the first weak die and the second weak die, based on the DQS delay values obtained by the basic DQS calibration operations. In the DQS calibration process in the normal mode, when the DQS calibration is not successful, the DQS calibration control circuit 231 may select the weakest die, based on the information about the first weak die and the second weak die. The DQS calibration control circuit 231 may perform the conditional mode operation in which the basic DQS calibration operation is performed "N–M" times in the conditional mode. For example, the basic DQS calibration operations are performed up to "N–M" times while changing the parameter or the setting value of a memory die selected as the weakest die.

The DQS delay circuit 232 may receive a first control signal CTRL1 from the DQS calibration control circuit 231. The DQS delay circuit 232 may generate the delayed DQS DQS_DLY by delaying the DQS by a delay time, in response to the first control signal CTRL1. The delay time between the delayed DQS DQS_DLY and the DQS may be set to a specific time period through a circuit configuration in the DQS delay circuit 232. The DQS delay circuit 232 may transmit the delayed DQS DQS_DLY to the DQS transmitting circuit (210 in FIG. 1). The DQS transmitting circuit (210 in FIG. 1) may transmit the delayed DQS DQS_DLY transmitted from the DQS delay circuit 232 to the first to fourth memory dies 110-140 as the DQS.

The counter circuit 233 may receive a second control signal CTRL2 from the DQS calibration control circuit 231. The counter circuit 233 may perform an up-counting operation in response to the second control signal CTRL2. The counter circuit 233 may receive the second control signal CTRL2 from the DQS calibration control circuit 231, before the calibration process for the DQS is performed. The counter circuit 233 may perform the up-counting operation in response to the second control signal CTRL2 to generate a count value CNT. The counter circuit 233 may transmit the count value CNT to the DQS calibration control circuit 231. The DQS calibration control circuit 231 may determine how many times the calibration process for the DQS has been performed, based on the count value CNT transmitted from the counter circuit 233.

The die information storage 234 may receive a third control signal CTRL3 and die information DIE_INFO from the DQS calibration control circuit 231 while performing the DQS calibration in the normal mode. The die information storage 230 may store the die information DIE_INFO in response to the third control signal CTRL3. The die information DIE_INFO may include information indicating a memory die designated as a first weak die and a memory die designated as a second weak die, as a result of performing the basic DQS calibration operation in the normal mode. Here, the first weak die may be defined as a memory die having a minimum DQS delay value closest to a median value of the total valid window. Here, the minimum DQS delay value may indicate the smallest delay value among the DQS delay values of the first to fourth memory dies 110-140, obtained through the DQS calibration. The second weak die may be defined as the memory die having a maximum DQS delay value closest to the median value of the total valid window. Here, the maximum DQS delay value may indicate the largest delay value among the DQS delay values of the first to fourth memory dies 110-140, obtained through the DQS calibration. When the DQS calibration is not successful even after the DQS calibration in the normal mode is completed, that is, when the DQS calibration in the conditional mode is performed, the DQS calibration control circuit 231 may request the transmission of die information S_DIE_INFO stored in the die information storage 234. The die information storage 234 may transmit the stored die information S_DIE_INFO to the DQS calibration control circuit 231 in response to the request of the DQS calibration control circuit 231. In some implementations, the median value of the total valid window is obtained by dividing a sum of a largest minimum DQS delay value of minimum DQS delay values of the plurality of memory dies and a smallest maximum DQS delay value of maximum DQS delay values of the plurality of memory dies by 2.

The die parameter adjustment circuit 235 may receive a fourth control signal CTRL4 from the DQS calibration control circuit 231 whenever the basic DQS calibration operation in the conditional mode is performed. The die parameter adjustment circuit 235 may transmit a setting modify signal S_MODIFY for changing a setting value of the memory die selected as the weakest memory die among the first to fourth memory dies 110-140 to the memory die selected as the weakest die, in response to the fourth control signal CTRL4. In an embodiment, the die parameter adjustment circuit 235 may change the setting values related to an input/output driver of the memory die selected as the weakest die. The setting values related to the input/output driver may include a voltage value of the output driver, whether to use on die termination (ODT), a clock delay value of the data buffer, and an ODT resistance value.

Figure 3:
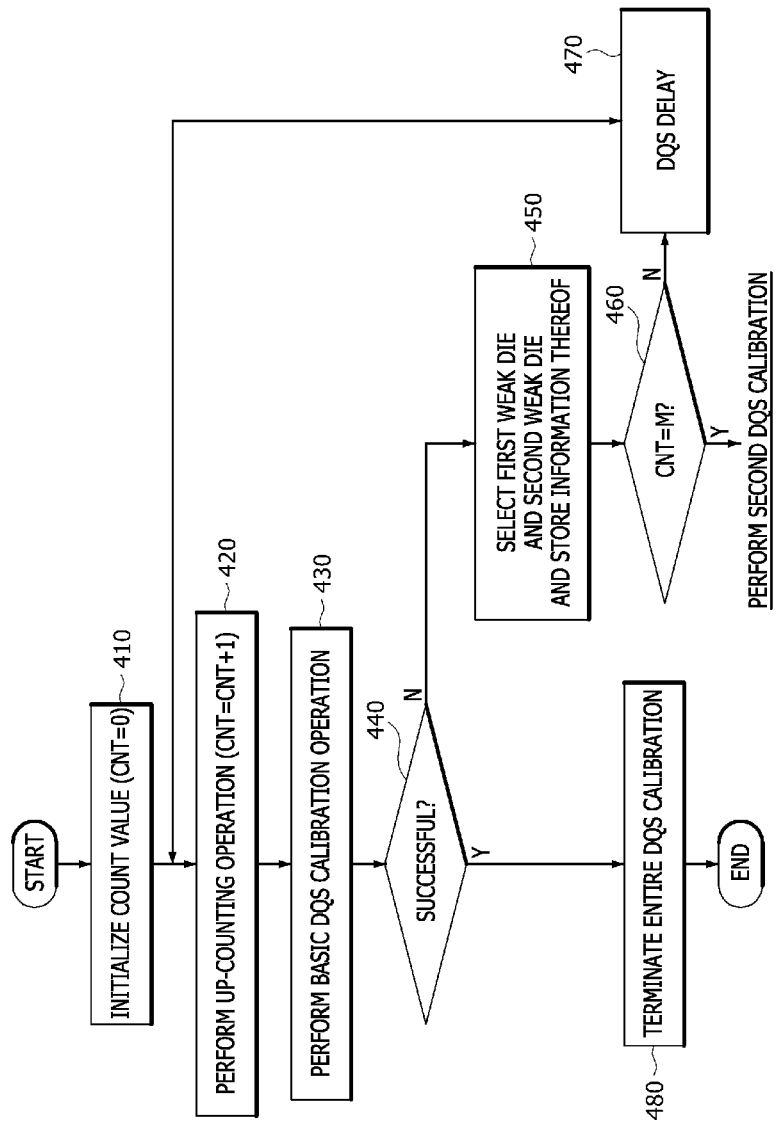
FIG. 3 is a flowchart illustrating DQS calibration in a normal mode of an entire DQS calibration process of the DQS calibration circuit of FIGS. 1 and 2.
Figure 4:
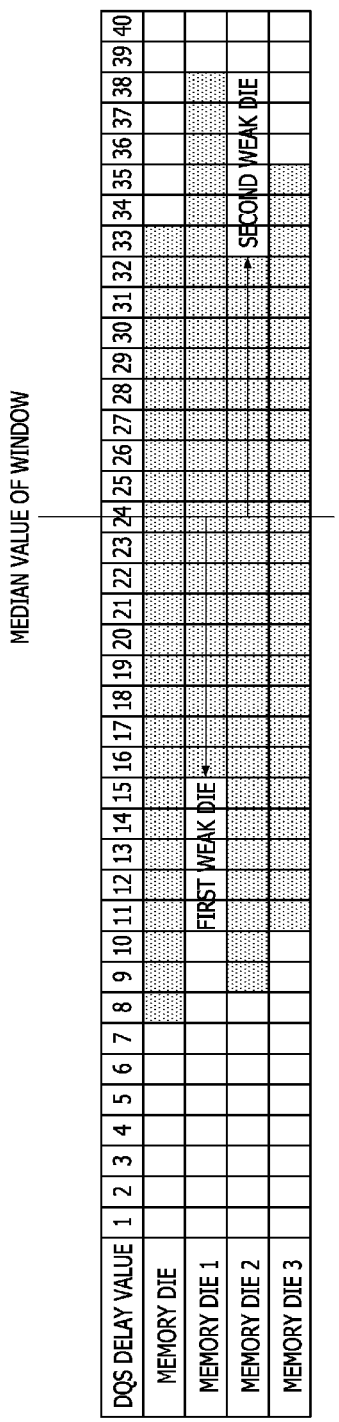
FIG. 4 is a diagram illustrating a method of selecting a first weak die and a second weak die in a process of performing DQS calibration in a normal mode.

FIG. 3 is a flowchart illustrating the DQS calibration in the normal mode, as part of the entire DQS calibration process of the DQS calibration circuit 230 illustrated in FIGS. 1 and 2. FIG. 4 is a diagram illustrating a method of selecting the first weak die and the second weak die in the process of performing the DQS calibration in the normal mode. In addition, FIG. 5 is a diagram illustrating a method of storing the first weak die and the second weak die in the process of performing the DQS calibration in the normal mode. In the following embodiment, it is assumed that N basic DQS calibration operations are performed (e.g., the basic DQS calibration operation may be repeated up to "N" times), and M basic DQS calibration operations are performed in the normal mode (e.g., up to "M" times of basic DQS calibration operations are performed in the normal mode) out of N basic DQS calibration operations, and N–M basic DQS calibration operations are performed in the conditional mode (e.g., up to "N–M" basic DQS calibration operations are performed in the conditional mode).

Referring to FIG. 3 and FIGS. 1 and 2, the DQS calibration control circuit 231 may perform the DQS calibration in the normal mode of steps 410 to 460. Specifically, at 410, the DQS calibration control circuit 231 may initialize the count value CNT of the counter circuit 233. To this end, the DQS calibration control circuit 231 may transmit the second control signal CTRL2 requesting the counter circuit 233 to initialize the initialization of the count value CNT. The counter circuit 233 may initialize the count value CNT to "0" in response to the second control signal CTRL2. At 420, the counter circuit 233 may perform an up-counting operation. To this end, the DQS calibration control circuit 231 may transmit the second control signal CTRL2 requesting the counter circuit 233 to perform the up-counting operation. The counter circuit 233 may perform the up-counting operation, that is, increasing the count value CNT by one in response to the second control signal CRTL2 requesting the up-counting operation. Accordingly, the count value CNT of the counter circuit 233 may be changed from "0" to "1."

At 430, the DQS calibration circuit 230 may perform a first basic DQS calibration operation. In the case of a read DQS calibration process, after reading test data from the first to fourth memory dies 110-140, the DQS calibration circuit 230 may determine whether the test data is located within a valid window of the DQS. In the case of a write DQS calibration process, after writing the test data into the first to fourth memory dies 110-140 and reading the test data, the DQS calibration circuit 230 may determine whether the test data is located within the valid window of the DQS during the write process. At 440, the DQS calibration circuit 230 may determine whether the first DQS calibration is successful, that is, whether the test data is located within the valid window of the DQS. When the first calibration is successful at 440, the entire DQS calibration may be terminated at 470. When the first DQS calibration is not successful at 440, operations 450 and 460 may be performed.

At 440, when the DQS calibration is not successful due to the first basic DQS calibration operation, at 450, a first weak die and a second weak die may be selected, and information on the selected first weak die and second weak die may be stored. Specifically, as illustrated in FIG. 4, by performing the first basic DQS calibration operation, a minimum delay value and a maximum delay value of the DQS for the first to fourth memory dies 110-140 may be obtained through timing comparing between the data and the DQS. The minimum delay value of the DQS may correspond to the minimum value of the valid window of the DQS. The maximum delay value of the DQS may correspond to the maximum value of the valid window of the DQS. As illustrated in FIG. 4, in the case of the first memory die (memory die 0) (110 of FIG. 1), the first memory die may represent a delay value distribution of a minimum delay value of "8" and a maximum delay value of "33." In the case of the second memory die (memory die 1) (120 of FIG. 1), the second memory die may represent a delay value distribution of a minimum delay value of "16" and a maximum delay value of "38." In the case of the third memory die (memory die 2) (130 of FIG. 1), the third memory die may represent a delay value distribution of a minimum delay value of "9" and a maximum delay value of "32." In addition, in the case of the fourth memory die (memory die 3) (140 of FIG. 1), the fourth memory die may represent a delay value distribution of the minimum delay value "11" and the maximum delay value "35."

From those delay value distributions, the memory die having the minimum DQS delay value closest to the median value of the entire valid window may be selected as the first weak die. In addition, the memory die having the maximum DQS delay value closest to the median value of the entire valid window may be selected as the second weak die. The median value of the entire valid window may be obtained by dividing the sum of the largest minimum DQS delay value among the minimum DQS delay values of memory dies and the smallest maximum DQS delay value among the maximum DQS delay values of memory dies by 2. In this embodiment, the largest minimum DQS delay value among the minimum DQS delay values is the minimum DQS delay value "16" of the second memory die (memory die 1) 120, and the smallest maximum DQS delay value among the maximum DQS delay values is the maximum DQS delay value "32" of the third memory die (memory die 2) 130. Accordingly, the median value of the entire effective window may be obtained by dividing a sum of 16 and 32 by 2: (16+32)/2=24. Accordingly, the second memory die (memory die 1) 120 having the minimum DQS delay value closest to the median value of "24" of the entire valid window may be selected as the first weak die. In addition, the third memory die (memory die 2) 130 having the maximum DQS delay value closest to the median value of "24" of the entire valid window may be selected as the second weak die.

After selecting the first weak die and the second weak die, the DQS calibration control circuit 231 may transmit the third control signal CTRL3 and the die information DIE_INFO to the die information storage 234. The die information storage 234 may store the die information DIE_INFO in response to the third control signal CTRL3. As shown in FIG. 5, when the count value CNT of the counter circuit 233 is "1," the die information storage 234 may store the second memory die (memory die 1) 120 and the third memory die (memory die 2) 130 as the first and second weak dies, respectively, as a result of the first basic DQS calibration operation.

Referring back to FIG. 3, at 460, the DQS calibration control circuit 231 may determine whether the count value CNT of the counter circuit 233 is equal to the maximum number of the basic DQS calibration operations that can be performed in DQS calibration in the normal mode, which is M. At 460, when the count value CNT is equal to M, the DQS calibration control circuit 231 may terminate the DQS calibration in the normal mode and perform the DQS calibration operation in the conditional mode. At 460, when the count value CNT is not equal to M at 460, the DQS calibration control circuit 231 may transmit the first control signal CTRL1 to the DQS delay circuit 232 at 470. The DQS delay circuit 232 may generate a delayed DQS DQS_DLY by delaying the timing of the DQS in response to the first control signal CTRL1 to transmit the delayed DQS DQS_DLY to the DQS transmission circuit 210. The DQS transmission circuit 210 may output the delayed DQS (DQS_DLY) transmitted from the DQS calibration control circuit 231 as the DQS. When the DQS delay operation at 470 is performed, the DQS calibration may go back to operation 420.

When the DQS calibration goes back to operation 420, the DQS calibration control circuit 231 may transmit the second control signal CTRL2 requesting the counter circuit 233 to perform an up-counting operation. The counter circuit 233 may perform an up-counting operation. For example, the counter circuit 233 may increase the count value CNT by one in response to the second control signal CRTL2. Accordingly, the count value CNT of the counter circuit 233 may be changed from "1" to "2." Next, at 430, a second basic DQS calibration operation may be performed.

The second basic DQS calibration operation may be performed in the same manner as the first basic DQS calibration operation. At 440, it may be determined whether the second basic DQS calibration operation has succeeded. When the second basic DQS calibration operation fails at 440, the DQS calibration control circuit 231 may select the first weak die and the second weak die in the second basic DQS calibration operation at 450, and store information about the first weak die and the second weak die in the die information storage 235. At 460, the DQS calibration control circuit 231 may determine whether the count value CNT of the counter circuit 233 is equal to M. At 460, when the count value CNT is equal to M, the DQS calibration control circuit 231 may perform second-step DQS calibration, and when the count value CNT is not equal to M, the DQS calibration control circuit 231 may perform the DQS delay operation of step 470. In this case, the delayed DQS DQS_DLY transmitted from the DQS calibration control circuit 231 to the DQS transmission circuit 210 may be additionally delayed than the delayed DQS DQS_DLY generated at 470 after performing the first basic DQS calibration operation. When operation 470 is performed, the process may go back to operation 420. Until the DQS calibration is successful at 440, these operations may be repeated "M" times at 460 until the count value CNT of the counter circuit 233 becomes "M." For example, M basic DQS calibration operations are repeatedly performed in the normal mode.

When it is determined at 440 that the DQS calibration is not successful until the count value CNT of the counter circuit 233 becomes "M," as shown in FIG. 5, the information about the first weak die and the information about the second weak die may be stored in the die information store 234, from the case in which the count value CNT is "1" (e.g., the first basic DQS calibration operation) to the case in which the count value CNT is "M" (e.g., the $M_{th}$ basic DQS calibration operation). As illustrated in FIG. 5, when the count value CNT is "2" (e.g., the second basic DQS calibration operation), the second memory die (memory die 1) 120 and the fourth memory die (memory die 3) 140 may be stored as the first weak die and the second weak die, respectively. When the count value CNT is "3" (e.g., the third basic DQS calibration operation), the second memory die (memory die 1) 120 and the third memory die (memory die 2) 130 may be stored as the first weak die and the second weak die, respectively. In addition, when the count value CNT is "M" (e.g., the $M_{th}$ basic DQS calibration operation), the second memory die (memory die 1) 120 and the third memory die (memory die 2) 130 may be stored as the first weak die and the second weak die, respectively.

Figure 6:
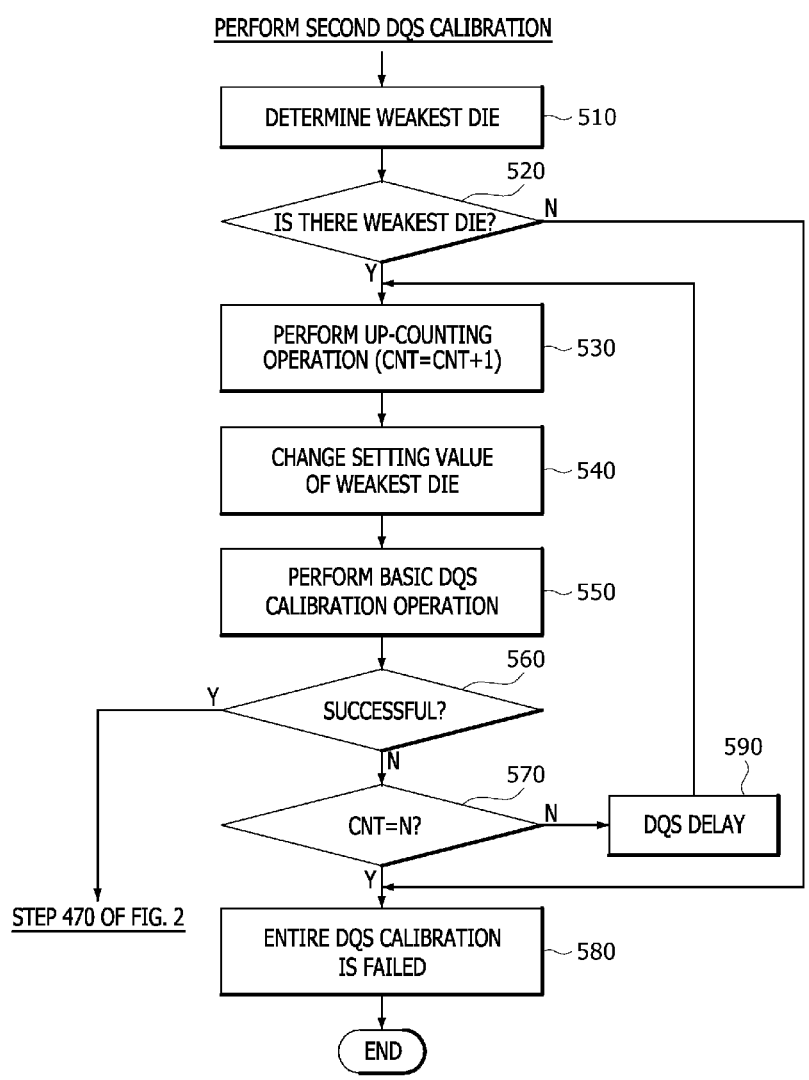
FIG. 6 is a flowchart illustrating a process in which the DQS calibration circuit of FIGS. 1 and 2 performs DQS calibration in a conditional mode.
Figure 7:
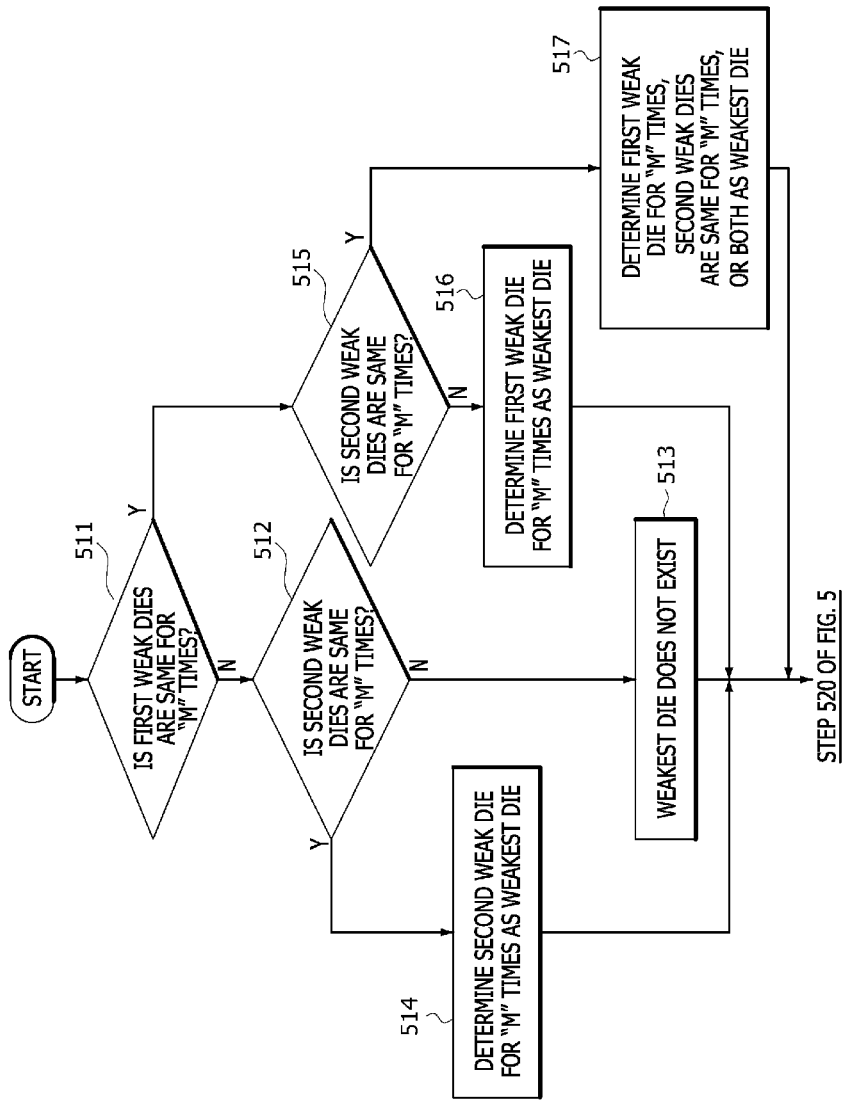
FIG. 7 is a flowchart illustrating a process of determining a weakest die at 510 in the DQS calibration process in the conditional mode of FIG. 6.

FIG. 6 is a flowchart illustrating a process in which the DQS calibration circuit 230 of FIGS. 1 and 2 performs DQS calibration in a conditional mode. In addition, FIG. 7 is a flowchart illustrating a process of determining a weakest die at 510 in the DQS calibration process in the conditional mode of FIG. 6.

Referring first to FIG. 6, at 460 of FIG. 5, when the count value CNT of the counter circuit (233 of FIG. 2) is "M," that is, when the DQS calibration is not successful after performing the first to $M_{th}$ basic DQS calibration operations through the DQS calibration process in the normal mode, the DQS calibration control circuit 231 may determine the weakest die at 510. The operation at 510 may be performed through the operations 511 to 517 of FIG. 7. Referring to FIG. 7, at 511, it may be determined whether the first weak dies are the same during the M basic DQS calibration operations. To this end, the DQS calibration control circuit 231 may transmit a third control signal CTRL3 requesting information on the first and second weak dies stored in the die information storage 234 to the die information storage 234. The die information storage 234 may transmit the information on the first weak die and the second weak die described with reference to FIG. 5 to the DQS calibration control circuit 231 in response to the third control signal CTRL3. The DQS calibration control circuit 231 may determine whether the first weak dies are the same memory die in the first to $M_{th}$ basic DQS calibration operations in the calibration in the normal mode, based on the information transmitted from the die information storage 234.

At 511, when the first weak dies are not the same while the first to $M_{th}$ basic DQS calibration operations are performed in the normal mode, it may be determined at 512 whether the second weak dies are the same memory die in the first to $M_{th}$ basic calibration operations in the normal mode. At 512, when the second weak dies are not the same while the first to $M_{th}$ basic DQS calibration operations in the normal mode are performed, it may be determined at 513 that the weakest die does not exist. That is, in the first to $M_{th}$ basic calibration operations in the normal mode, when the memory dies selected as the first weak die are not the same and the memory dies selected as the second weak die are not the same, it may be determined that the weakest die is not exist.

At 512, when the memory dies selected as the second weak dies are the same memory die in the first to $M_{th}$ basic DQS calibration operations in the normal mode, at 514, the memory die may be determined as the weakest die. That is, while the first to $M_{th}$ basic calibration operations in the normal mode are performed, when the memory dies selected as the first weak die are not the same memory die and the memory dies selected as the second weak die are the same memory die, the memory die selected as the second weak die may be determined as the weakest die.

At 511, when the memory dies selected as the first weak die are the same memory die while the first to $M_{th}$ basic DQS calibration operations in the normal mode are performed, at 515, it may be determined whether the memory dies selected as the second weak die are the same memory die while the first through $M_{th}$ basic DQS calibration operations in the normal mode are performed. At 515, when the memory dies selected as the second weak die are not the same memory die while the first to $M_{th}$ basic DQS calibration operations in the normal mode are performed, at 516, the memory die selected as the first weak die is determined as the weakest die while the first through $M_{th}$ basic DQS calibration operations are performed in the normal mode. That is, the memory dies selected as the first weak die are the same memory die, and the memory dies selected as the second weak die are not the same memory die while the first to $M_{th}$ basic DQS calibration operations in the normal mode are performed, the memory die selected as the first weak die is determined as the weakest die.

At 515, when the memory dies selected as the second weak die are the same memory die while the first to $M_{th}$ basic DQS calibration operations in the normal mode are performed, at 517, the memory die selected as the first weak die or the memory die selected as the second weak die may be determined as the weakest die while the first to $M_{th}$ basic DQS calibration operations in the normal mode are performed. In an example, in this case, one of the first weak die and the second weak die can be determined as the weakest die. In another example, both the memory die selected as the first weak die and the memory die selected as the second weak die may be determined as the weakest dies. That is, while the first to $M_{th}$ basic DQS calibration operations in the normal mode are performed, when the memory dies selected as the first weak die are the same memory die and the memory dies selected as the second weak die are the same memory die, the memory die selected as the first weak die, the memory die selected as the second weak die, or both the memory dies may be determined as the weakest die.

Referring back to FIG. 6, when the weakest die is determined through the processes of steps 511 to 517 described with reference to FIG. 7, at 520, it may be determined whether the weakest die exists. When the weakest die does not exist at 520, it may be determined that all DQS calibrations at 580 have failed. When the weakest die exists at 520, that is, during the first to $M_{th}$ basic DQS calibration operations in the normal mode, when at least one of the memory dies selected as the first weak die and the memory dies selected as the second weak die is the same memory die, an up-counting operation of the counter circuit 233 may be performed at 530. To this end, the DQS calibration control circuit 231 may transmit the second control signal CTRL2 requesting the counter circuit 233 to perform an up-counting operation. The counter circuit 233 may perform the up-counting operation in response to the second control signal CRTL2. For example, the counter circuit 233 increases the count value CNT by one in response to the second control signal CRTL2. Accordingly, the count value CNT of the counter circuit 233 may be changed from "M" to "M+1."

Next, at 540, a setting value of the memory die determined as the weakest die may be changed. For example, when the second memory die (memory die 1) 120 among the first to fourth memory dies 110-140 is determined to be the weakest die, one of the setting values related to an input/output driver of the second memory die (memory die 1) 120 may be changed. To this end, the DQS calibration control circuit 231 may transmit a fourth control signal CTRL4 to the die parameter adjustment circuit 235. The die parameter adjustment circuit 235 may transmit a control signal S_MODIFY for changing one of the setting values related to the input/output driver of the second memory die (memory die 1) 120 to the second memory die (memory die 1) 120 in response to the fourth control signal CTRL4. The setting values related to the input/output drivers of the second memory die (memory die 1) 120 may include setting values for changing the voltage value of the output driver, whether to use the ODT, the clock delay value of the data buffer, and the ODT resistance value.

Next, at 550, a first basic DQS calibration operation in the conditional mode (e.g., $(M+1)_{th}$ basic DQS calibration operation as a whole) may be performed. The "$M+1$"$^{th}$ basic DQS calibration operation may be performed in the same manner as the basic DQS calibration operation performed at 430 of FIG. 3. Next, at 560, it may be determined whether the $(M+1)_{th}$ basic DQS calibration operation is successful. When the $(M+1)_{th}$ basic DQS calibration operation is successful at 560, the entire DQS calibration may be terminated at 480 of FIG. 3. When the $(M+1)_{th}$ basic DQS calibration operation is not successful at 560, at 570, it may be determined whether the count value CNT of the counter circuit 233 is the same as the maximum number (e.g., "N") of basic DQS calibration operations in the normal mode and in the conditional mode that may be performed.

At 560, when the count value CNT is equal to N, at 580, the entire DQS calibration may be treated as failed. At 560, when the count value CNT is not equal to N, the DQS delay operation at 590 may be performed. The DQS delay operation at 590 may be performed in the same manner as the DQS delay operation at 470 of FIG. 3. When the operation 590 is performed, the process may go back to operation 530. When the process goes back to the operation 530, the DQS calibration control circuit 231 may transmit the second control signal CTRL2 requesting the counter circuit 233 to perform an up-counting operation. The counter circuit 233 may perform the up-counting operation. For example, the counter circuit 233 may increase the count value CNT by one. Accordingly, the count value CNT of the counter circuit 233 may be changed from "M+1" to "M+2." Next, at 540, the setting value of the weakest die may be changed, and at 550, the $(M+2)_{th}$ basic DQS calibration operation may be performed. Operations 530 to 550 may be repeated until the DQS calibration succeeds at 560 or the count value CNT of the counter circuit 233 becomes N at 570.

Only limited examples of implementations or embodiments of the disclosed technology are described or illustrated. Variations and enhancements for the disclosed implementations or embodiments and other implementations or embodiments are possible based on what is disclosed and illustrated in this patent document.

What is claimed is:

1. A memory controller comprising:
    a data strobe signal (DQS) calibration circuit configured to calibrate timing of a data strobe signal (DQS) for a plurality of memory dies by performing N unit DQS calibration operations, wherein N is a natural number,
    wherein performing the N unit DQS calibration operations includes:
    performing M unit DQS calibration operations in a normal mode on the plurality of memory dies, wherein M is a natural number smaller than N;
    upon failure of calibration during the M unit DQS calibration operations in the normal mode, determining a representative memory die of the plurality of memory dies that causes the failure of calibration; and
    performing N-M unit DQS calibration operations in a conditional mode on the plurality of memory dies by varying parameters associated with the representative memory die of the plurality of memory dies, and
    wherein the DQS calibration circuit is configured to, upon successful completion of DQS calibration during P unit DOS calibration operations in the normal mode, terminate a DQS calibration in the normal mode without further performing DOS calibration operations, wherein P is a natural number equal to or smaller than M.

2. The memory controller of claim 1, wherein the plurality of memory dies is coupled to the memory controller through a channel.

3. The memory controller of claim 1, wherein terminating the DQS calibration in the normal mode without further performing DQS calibration operations includes terminating a DQS calibration without further performing DQS calibration operations in the conditional mode.

4. The memory controller of claim 1, wherein the DQS calibration circuit is configured to, upon successful completion of DQS calibration during P unit DQS calibration operations in the normal mode, terminate an entire DQS calibration in the normal mode and in the conditional mode without further performing DQS calibration operations, wherein P is a natural number equal to or smaller than M.

5. The memory controller of claim 4, further comprising a nonvolatile memory circuit configured to store information on the representative memory die in response to a successful completion of DQS calibration in the conditional mode and a termination of the DQS calibration in the conditional mode.

6. The memory controller of claim 1,
    wherein the DQS calibration circuit include a DQS calibration control circuit configured to determine a first weak memory die and a second weak memory die as candidate memory dies for the representative memory die upon performing each unit DQS calibration operation in the normal mode.

7. The memory controller of claim 6, further comprising a die information storage circuit configured to store information on the first weak memory die and the second weak memory die.

8. The memory controller of claim 6, wherein a minimum DQS delay value of the first weak memory die is closer to a median value of an entire valid window of DQS than minimum DQS delay values of other memory dies, and
    a maximum DQS delay value of the second weak memory die is closer to the median value of the entire valid window of DQS than maximum DQS delay values of other memory dies.

9. The memory controller of claim 8, wherein the median value of the entire valid window is obtained by dividing a sum of a largest minimum DQS delay value of minimum DQS delay values of the plurality of memory dies and a smallest maximum DQS delay value of maximum DQS delay values of the plurality of memory dies by 2.

10. The memory controller of claim 9, wherein the DQS calibration control circuit is configured to determine the representative memory die before performing an M+1 unit calibration operations in the conditional mode.

11. The memory controller of claim 10, wherein the DQS calibration control circuit is configured to determine that the representative memory die does not exist upon determination that the memory dies selected as the first weak memory die during a first to $M_{th}$ unit DQS calibration operations in the normal mode are not a same memory die and the memory dies selected as the second weak memory die during the first to $M_{th}$ unit DQS calibration operations in the normal mode are not a same memory die.

12. The memory controller of claim 10, wherein the DQS calibration control circuit is configured to determine that the first weak memory die is the representative memory die upon determination that the memory dies selected as the first weak memory die during a first to $M_{th}$ unit DQS calibration operations in the normal mode are a same memory die and the memory dies selected as the second weak memory die during the first to $M_{th}$ unit DQS calibration operations in the normal mode are not a same memory die.

13. The memory controller of claim 10, wherein the DQS calibration control circuit is configured to determine that the second weak die is the representative memory die upon determination that the memory dies selected as the first weak memory die during a first to $M_{th}$ unit DQS calibration operations in the normal mode are not a same memory die and the memory dies selected as the second weak memory die during the first to $M_{th}$ unit DQS calibration operations in the normal mode are a same memory die.

14. The memory controller of claim 10, wherein the DQS calibration control circuit is configured to determine at least one of the first weak memory die or the second weak memory is the representative memory die upon determination that the memory dies selected as the first weak memory die during a first to $M_{th}$ unit DQS calibration operations in the normal mode are a same memory die and the memory dies selected as the second weak memory die during the first to $M_{th}$ unit DQS calibration operations in the normal mode are a same memory die.

15. The memory controller of claim 10, further comprising a die parameter adjustment circuit configured to adjust the parameters associated with the representative memory die of the plurality of memory dies, wherein the DQS calibration control circuit is configured to adjust the parameters associated with the representative memory die of the plurality of memory dies through the die parameter adjustment circuit upon performing each of M+1 to N unit DQS calibration operations in the conditional mode.

16. The memory controller of claim 15, wherein the parameters associated with the representative memory die of the plurality of memory dies includes a setting value of an input/output driver of the representative memory die.

17. The memory controller of claim 16, wherein the setting value of the input/output driver of the representative memory die includes a setting value for changing a voltage value of an output driver of the representative memory die, a setting value associated with whether to use on-die termination (ODT), a clock delay value of a data buffer, and an ODT resistance value.

18. A memory system comprising:
a plurality of memory dies; and
a memory controller coupled to the plurality of memory dies through a channel,
wherein the memory controller includes a data strobe signal (DQS) calibration circuit configured to calibrate timing of a data strobe signal (DQS) for the plurality of memory dies by performing N unit DQS calibration operations, wherein N is a natural number,
wherein performing the N unit DQS calibration operations includes:
performing M unit DQS calibration operations in a normal mode on the plurality of memory dies, wherein M is a natural number smaller than N;
upon failure of calibration during the M unit DQS calibration operations in the normal mode, determining a representative memory die of the plurality of memory dies that causes the failure of calibration; and
performing N-M unit DQS calibration operations in a conditional mode on the plurality of memory dies by varying parameters associated with the representative memory die of the plurality of memory dies, and
wherein the DOS calibration circuit is configured to, upon successful completion of DQS calibration during P unit DOS calibration operations in the normal mode, terminate a DOS calibration in the normal mode without further performing DOS calibration operations, wherein P is a natural number equal to or smaller than M.

* * * * *